(12) United States Patent
Cunningham (10) Patent No.: US 11,034,307 B1
(45) Date of Patent: Jun. 15, 2021

(54) LOW PROFILE TOOLBOX AND HEADACHE RACK MOUNTING BRACKET

(71) Applicant: THI CANADA, INC., Oakville (CA)

(72) Inventor: Michael Cunningham, Milton (CA)

(73) Assignee: THI CANADA, INC., Oakville (CA)

( * ) Notice: Subject to any disclaimer, the term of this patent is extended or adjusted under 35 U.S.C. 154(b) by 0 days.

(21) Appl. No.: 16/857,396

(22) Filed: Apr. 24, 2020

(51) Int. Cl.
*B60R 9/06* (2006.01)
*B60R 11/06* (2006.01)
*B60R 11/00* (2006.01)

(52) U.S. Cl.
CPC ............ *B60R 9/065* (2013.01); *B60R 9/06* (2013.01); *B60R 11/06* (2013.01); *B60R 2011/004* (2013.01); *B60R 2011/0066* (2013.01)

(58) Field of Classification Search
CPC ................... B60R 9/06; B60R 9/065
USPC ..................... 224/403–404; 296/3
See application file for complete search history.

(56) References Cited

U.S. PATENT DOCUMENTS

| | | | | |
|---|---|---|---|---|
| 4,405,170 A * | 9/1983 | Raya | ............... | B60P 3/42 224/309 |
| 4,611,824 A * | 9/1986 | McIntosh | ............... | B60R 21/00 280/748 |
| 5,002,324 A * | 3/1991 | Griffin | ............... | B60P 3/42 224/405 |
| 5,035,458 A * | 7/1991 | Boensch | ............... | B60R 21/00 296/1.05 |
| 5,152,574 A * | 10/1992 | Tucker | ............... | B60J 7/104 296/100.18 |
| 5,238,280 A * | 8/1993 | Christensen | ............... | B60R 9/00 296/3 |
| 5,258,893 A * | 11/1993 | Finneyfrock | ............... | B60Q 1/30 280/748 |
| 5,310,238 A * | 5/1994 | Wheatley | ............... | B60J 7/104 296/100.18 |
| 5,353,826 A * | 10/1994 | Davis, Sr. | ............... | B60J 7/102 135/119 |
| 5,584,521 A | 12/1996 | Hathaway et al. | | |
| 5,692,791 A * | 12/1997 | Sulzer | ............... | B60J 7/102 224/403 |
| D398,284 S * | 9/1998 | Carter | ............... | D12/406 |
| 6,196,602 B1 * | 3/2001 | Esplin | ............... | B60P 7/08 224/405 |
| D494,921 S * | 8/2004 | Taylor | ............... | D12/414 |
| 6,983,968 B2 | 1/2006 | Brauer et al. | | |
| D553,553 S * | 10/2007 | Taylor | ............... | D12/414 |
| 7,296,836 B1 * | 11/2007 | Sabo | ............... | B60P 3/40 296/3 |
| 7,296,837 B2 * | 11/2007 | Niedziela | ............... | B60P 3/40 224/405 |
| 7,396,046 B2 * | 7/2008 | Cole | ............... | B60Q 1/2661 224/405 |
| D582,337 S * | 12/2008 | Derecktor | ............... | D12/406 |
| 7,544,027 B2 * | 6/2009 | Barker | ............... | B60P 1/43 410/3 |
| D669,840 S * | 10/2012 | Gros | ............... | D12/406 |

(Continued)

*Primary Examiner* — Justin M Larson
(74) *Attorney, Agent, or Firm* — The Dobrusin Law Firm, P.C.; Bryan S. Lemanski (57) ABSTRACT

A bracket comprising: (a) a mating portion; (b) a channel secured to the mating portion; and (c) a tab extending from a terminal edge of the mating portion; wherein the mating portion abuts a top edge of a cargo box of a vehicle and the tab at least partially extends around a lip of the cargo box to secure the bracket to the top edge of the cargo box.

19 Claims, 5 Drawing Sheets

(56) References Cited

U.S. PATENT DOCUMENTS

| | | | |
|---|---|---|---|
| 8,403,191 B2* | 3/2013 | Russo | B60R 9/00 |
| | | | 224/405 |
| 8,523,128 B2* | 9/2013 | Palermo | B60P 7/0815 |
| | | | 248/231.71 |
| 8,668,124 B2* | 3/2014 | Kennedy | B60R 9/045 |
| | | | 224/403 |
| 8,668,125 B2* | 3/2014 | Williams | B60R 9/06 |
| | | | 224/405 |
| 9,132,784 B2 | 9/2015 | Harrison | |
| 9,150,161 B2* | 10/2015 | Laverack | B60R 9/06 |
| 9,637,178 B1* | 5/2017 | Diller | B60R 19/52 |
| 9,725,046 B2* | 8/2017 | Perry | B60R 9/045 |
| 10,046,691 B2 | 8/2018 | Petru | |
| 10,207,650 B1* | 2/2019 | Banegas | B62D 33/0207 |
| D857,603 S* | 8/2019 | Mosingo | D12/222 |
| D857,604 S* | 8/2019 | Mosingo | D12/222 |
| D857,605 S* | 8/2019 | Mosingo | D12/222 |
| 10,507,874 B2* | 12/2019 | Crandall | B60P 7/0815 |
| 10,543,790 B2* | 1/2020 | Marr, Jr. | B60R 9/00 |
| 2003/0011180 A1 | 1/2003 | Coffman et al. | |
| 2008/0054037 A1* | 3/2008 | Niedziela | B60R 9/00 |
| | | | 224/403 |
| 2012/0318189 A1 | 12/2012 | Oyoung | |
| 2013/0181023 A1* | 7/2013 | Shawanda | B60R 9/06 |
| | | | 224/403 |
| 2014/0034696 A1* | 2/2014 | Marr | B60R 9/045 |
| | | | 224/405 |
| 2017/0166105 A1* | 6/2017 | Puchkoff | B60P 7/0815 |
| 2019/0367101 A1* | 12/2019 | McFadden | B60R 9/06 |

* cited by examiner

LOW PROFILE TOOLBOX AND HEADACHE RACK MOUNTING BRACKET

FIELD

The present teachings generally relate to a mounting bracket, and more particularly, to a vehicle mounting bracket to mount a toolbox or headache rack.

BACKGROUND

Vehicle accessories, and particularly, accessories for vehicles having a cargo box, have become increasingly prominent. Often times vehicles having a cargo box, such as a pickup truck, will have one or more accessories fixed directly to a portion of the cargo box. The accessories may be fixed within the confines of the vehicle, may be secured along walls defining the cargo box, or both. For example, a headache rack may be disposed across a width of the cargo box and secured along a top edge of the cargo box by one or more brackets. The headache rack may be positioned behind a cab of the vehicle and be capable of bearing a load to protect a passenger within the cabin or help secure one or more items within the cargo box. It should be noted that many accessories may be secured to the cargo box, such as a toolbox, tonneau cover, cargo net, step, tie down connectors, or a combination thereof.

Conventional attachment mechanisms to secure the accessories to the cargo box often require permanent modification to the cargo box. For example, a top edge and/or a panel of the cargo box may be refabricated to permanently mount the accessories. One or more brackets may be drilled, welded, or otherwise secured to the top edge and/or the panel of the cargo box. As a result, if an accessory is ever to be removed, the cargo box may have permanent deformation or holes, leaving an aesthetically displeasing surface, risk of degradation to the cargo box or interior of the vehicle, or both. Additionally, refabricating of the cargo box may require an extensive amount of time and/or money and may often need to be completed by a professional in the industry. Furthermore, the refabricating may be specific based upon each vehicle given that many vehicles may have different dimensions and/or configurations, resulting in the inability to design a common mounting structure. Due to no common mounting structure, the mounting may also be insecure and cause rattling or damage to the accessory, potentially resulting in the accessory disconnecting from the cargo box.

Thus, given the aforementioned issues, there remains a need for a mounting mechanism to securely mount an accessory to a cargo box of a vehicle. What is needed is a bracket secured to a portion of a cargo box to prevent movement, rattling, vibration, or a combination thereof of the accessory during operation of the vehicle. There also remains a need for a bracket to mount the accessory without requiring refabricating of the cargo box. Therefore, what is needed is a bracket that may mount directly to existing features of the cargo box. Additionally, there remains a need for a bracket that may quickly and easily attach to a cargo box of a vehicle. Accordingly, what is needed is a bracket that may provide at least partial commonality between different vehicles, accounting for varying dimensions and/or configurations.

SUMMARY

The present teachings meet one or more of the present needs by providing: a bracket comprising: (a) a mating portion; (b) a channel secured to the mating portion; and (c) a tab extending from a terminal edge of the mating portion; wherein the mating portion abuts a top edge of a cargo box of a vehicle and the tab at least partially extends around a lip of the cargo box to secure the bracket to the top edge of the cargo box.

The present teachings meet one or more of the present needs by providing a bracket, wherein: the channel is at least partially supported by the mating portion and is connected to the mating portion by a gusset; the channel is supported by an extension of the mating portion extending toward an inside of the cargo box; the mating portion includes a hole that at least partially aligns with a stake pocket along the top edge of the cargo box, and a fastener extends through the hole and into the stake pocket to secure the bracket; the fastener extends into the stake pocket and is secured to a driver positioned within the stake pocket; the bracket is further mounted to the driver via a fastener extending through the bracket and an inner panel of the cargo box; the channel is secured to the mating portion near a first end and the tab is positioned near an opposing second end of the mating portion; the mating portion includes a pocket recessed from an external surface of the mating portion, and the mating portion is at least partially received by a stake pocket along the top edge of the cargo box; the bracket secures an accessory to the cargo box; the accessory is a headache rack disposed across opposing sides of the cargo box and positioned adjacent to a cab of the vehicle; or a combination thereof.

The present teachings meet one or more of the present needs by providing a bracket assembly including a bracket and a driver having a driver bracket, wherein the driver bracket is positioned within a cavity of a wall defining a portion of the cargo box, and the bracket is secured to the driver bracket via a fastener, a nut, or both. The driver may include a fixed nut secured to the driver bracket and a fastener extending through the bracket is received by the fixed nut to secure the bracket to the driver bracket. The driver may include a fixed fastener secured to the driver bracket and the fixed fastener extends through a hole of the bracket to secure the bracket to the drive bracket. The channel of the bracket may be U-shaped and have an open end to receive an accessory. The mating portion may be secured to the cargo box at both a first end and an opposing second end by a fastener.

The present teachings also meet one or more of the present needs by providing a bracket comprising: (a) a mating portion having a tab extending from a terminal edge, wherein the tab includes a hole to receive a fastener to secure the mating portion to a top edge of a cargo box of a vehicle; and (b) a channel positioned near an opposing terminal edge of the mating portion and secured to an outer surface of the mating portion, wherein the channel is further secured to the mating portion by a gusset; wherein the fastener extends through the tab to engage a lip of the cargo box, and the engagement results in a clamping force between an inner surface of the mating portion and the top edge of the cargo box.

Additionally, the present teachings provide: a mounting mechanism to securely mount an accessory to a cargo box of a vehicle; a bracket secured to a portion of a cargo box to prevent movement, rattling, vibration, or a combination thereof of the accessory during operation of the vehicle; a bracket to mount the accessory without requiring refabricating of the cargo box; a bracket that may mount directly to existing features of the cargo box; a bracket that may quickly and easily attach to a cargo box of a vehicle; a bracket that may provide at least partial commonality between different vehicles, accounting for varying dimensions and/or configurations; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a bracket in communication with a cargo box of a vehicle. The cargo box may be defined by one or more walls, panels, sides, or a combination thereof forming an inner portion of the cargo box. The inner portion may be used to store one or more items, transport one or more items, or a combination thereof. The walls, panels, sides, or a combination thereof of the cargo box may extend from a supporting surface of the inner portion of the cargo box and may terminate at a top. The walls may be formed from one or more panels. For example, each wall of the cargo box may be formed from an outer fender of the vehicle and an inner panel. The walls may be at least partially hollow, may include one or more attaching features, or both. For example, the walls may include a tie-down mount, clip, receiving feature, fastener, hook, hole, nut, or a combination thereof.

The cargo box may also include one or more stake pockets. The stake pockets may generally be positioned along a top edge of the cargo box, such as along a top edge of the walls defining the cargo box. However, it is envisioned that the stake pockets may be positioned anywhere along the cargo box other than just the top edge of the cargo box. The stake pockets may function to receive a structure to secure the structure to the cargo box. For example, the stake pockets may generally be utilized to hold a stake in a desired position to build a sidewall to help keep cargo contained within the cargo box. However, the existing stake pockets may also be utilized with the bracket mounting described herein to secure an accessory to the cargo box. Therefore, the present teachings may advantageously secure accessories to the cargo box without requiring additional holes or mounting features being added to the cargo box (i.e., refabricating).

The bracket may function to secure an accessory directly or indirectly to the cargo box. The bracket may be positioned anywhere along the cargo box based on a desired mounting location of the accessory. The bracket may be secured to the inner panels of the cargo box, the supporting surface within the inside of the cargo box, a fender near the cargo box, an edge of the cargo box, or a combination thereof.

The accessory being secured to the cargo box may be any accessory. The accessory may be a headache rack, toolbox, bed extension, cargo net, cargo divider, tonneau cover, other accessory, or a combination thereof. The present teachings may provide a mounting mechanism for any accessory, such as those designed by the original equipment manufacturer (OEM), from secondary aftermarket manufacturers, or both. While specific mounting techniques may be described herein, the brackets utilized may be configured for a variety of configurations and positions. Thus, the present teachings beneficially provide a mounting structure with increased tunability and customization when compared to conventional mounting techniques.

A single bracket may be utilized to mount one or multiple accessories to the cargo box. Alternatively, a plurality of brackets may be used to mount a single accessory to the cargo box. For example, a passenger side bracket and a driver side bracket may be positioned on opposing sides of the cargo (on a passenger side and a driver side, respectively) so that an accessory may be disposed across a width of the cargo box.

The bracket may be recessed from a top edge of the cargo box such that, when the bracket is mounted, a tonneau cover may still be disposed over the cargo box when the accessory is not attached to the bracket. Alternatively, the bracket may be supported by the top edge of the cargo box. The bracket may be coextensive with one or more edges of the cargo box, one or more sides of the cargo box, or both. The bracket may be coaxial with a portion of the cargo box. For example, the bracket may be disposed along a longitudinal top edge of the cargo box and a longitudinal axis of the bracket may be coaxial with the longitudinal axis of the top edge. However, it should be noted that the bracket may also be offset from an axis of the cargo box. Therefore, it is contemplated that the bracket may be configured to communicate with any portion of the cargo box to meet the demands of a given application.

The bracket may be formed from a unitary piece of material. The bracket may include a plurality of components secured to one another. The bracket may be metal, plastic, or both. The bracket may be stamped, molded, extruded, pultruded, die-cut, cast, or a combination thereof. The bracket may include a finish to prevent degradation due to moisture, debris, other contaminants, or a combination thereof. The finish may be an electroplating, zinc coating, lubricant, paint, or a combination thereof.

The bracket may include a mating portion. The mating portion may function to mate with the cargo box. The mating portion may directly or indirectly support the accessory being mounted to the cargo box. The mating portion may extend along a panel, a wall, an edge, a surface, or a combination thereof of the cargo box. The mating portion may determine a position of the accessory when mounted. For example, the mating portion may be positioned near a cab of the vehicle, near a tailgate of the cargo box, or both. Accordingly, the accessory may either be positioned near the cab, the tailgate, or both. It is also envisioned that the mating portion may be mountable in a variety of locations along the cargo box to provide further customization.

The mating portion may at least partially follow a contour of the cargo box. The mating portion may include one or more bends, angles, contours, notches, steps, or a combination thereof to at least partially or substantially follow one or more bends, angles, contours, notches, steps, or a combination thereof of the cargo box. The mating portion may extend around an edge of the cargo box to provide further stability. For example, the mating portion may be substantially "L" shaped to abut a top edge of the cargo box and an inner panel of the cargo box. Therefore, the mating portion may advantageously prevent vertical, lateral, and rotational movement of the bracket once installed.

The mating portion may align with an existing feature along the cargo box, such as a hole, latch, hook, loop, or a combination thereof. The mating portion may align with a stake pocket along the cargo box. The mating portion may include one or more holes that align with the stake pocket such that a fastener may extend through the bracket and into the stake pocket. Alternatively, a fastener may extend from the stake pocket and into the bracket to secure the bracket to the cargo box. The mating portion may also include a feature that communicates with the stake pocket to maintain a position of the mating portion relative to the stake pocket. The feature of the mating portion may be a pocket recessed from an outer surface of the mating portion that is at least partially received by the stake pocket of the cargo box. The pocket of the mating portion may be any desired shape, but it is particularly envisioned that the pocket of the mating portion may be shaped substantially similar to the stake pocket.

The one or more holes may be located anywhere along the mating portion. It is also envisioned that the mating portion may include a plurality of holes, and each of the holes aligns with an existing feature of the cargo box to provide a plurality of mounting locations of the bracket, thereby even further improving the stability of the bracket once installed. It should also be noted that the holes may not align with an existing feature of the cargo box and may mate with a surface of the cargo box.

The stake pocket of the cargo box may secure the bracket alone or in combination with additional features of the cargo box. The stake pocket may house a driver. The drive may function as an intermediary between the bracket and the cargo box to secure the bracket to the cargo box. The driver may be located anywhere inside or outside of the stake pocket. However, it is envisioned that the driver may be located within the stake pocket, thereby substantially preventing degradation of the drive due to environmental degradation and further preventing protrusion of the driver into the cargo box.

The driver may include a driver bracket. The driver bracket may function to mount to the cargo box within the stake pocket. The driver bracket may be any desired shape to fit within the stake pocket. The driver bracket may include one or more fasteners, one or more nuts, or both. The driver bracket may receive one or more fasteners. The fasteners, nuts, or both may be fixedly secured to the driver bracket. For example, the driver bracket may include a welded nut, welded fastener, or both.

The nuts, fasteners, or both of the driver may be at least partially enclosed within tubing to prevent degradation due to environmental contaminants. The tubing may at least partially encase the fasteners, nuts, or both. It is envisioned that the tubing may enclose portions of the fasteners, nuts, or both that do not engage the cargo box, the bracket, or both.

The driver bracket may facilitate mounting the bracket to a plurality of points along the cargo box. The driver bracket may secure the bracket to and/or near the stake pocket. The driver bracket may also secure the bracket to one or more additional points of the cargo box. For example, the driver bracket may also secure the bracket to an inner panel, wall, or other surface of the cargo box. The mounting locations of the bracket may be coplanar, in different planes, or both. The mounting locations may be substantially parallel, orthogonal, or both. For example, an inner panel of the cargo box may provide a first mounting location that is substantially perpendicular to a top edge of the cargo box where the stake pocket is located. However, it should be noted that the mounting locations may be anywhere along the cargo box. Therefore, it may be gleaned from the present teachings that the driver bracket may be any desired dimensions to accommodate the contours and/or configuration of different cargo boxes.

The driver bracket may position the bracket so that a channel of the bracket may properly align with the cargo box. The channel may be secured or integrally (i.e., monolithically) formed with the mating portion of the bracket. The channel may function to receive and/or secure the accessory to the bracket. The accessory may be secured to the channel using any desired fastening means. However, one exemplary configuration of the channel may include one or more slots that receive a fastener so that the fastener engaged the accessory and secures the accessory to the channel.

The channel may include an open portion to receive the accessory. The channel may be U-shaped, V-shaped, D-shaped, G-shaped, C-shaped, or a combination thereof. The channel may include one or more flanges to engage the accessory. The channel may be free of flanges to allow for easy insertion and/or removal of the accessory from the channel.

The channel may be monolithically formed with the mating portion of the bracket. For example, the entire bracket may be stamped from a single piece of material. Alternatively, the channel may be fastened to the mating portion by welding, one or more fasteners, adhesion, other bonding methods, or a combination thereof.

An axis of the channel may be positioned at a desired angle relative to the mating portion, either by intended design or as a result of positioning of the channel and the mating portion before bonding the two components together. For example, an axis of the channel (e.g., a longitudinal axis) may be substantially coaxial with a longitudinal axis of the mating portion, may be substantially perpendicular to the longitudinal axis of the mating portion, or may form any other desired angle with the longitudinal axis of the mating portion.

The channel may be secured to the mating portion so that the mating portion at least partially supports a weight of the channel, the accessory, or both. The channel may be supported by a surface, such as an outer surface free of contact with the cargo box, of the mating portion. The channel may be further reinforced and/or support by additional features of the bracket or mating portions. For example, the channel may be support by an extension of the mating portion. The extension may project in a direction of the channel to further support the channel. The extension may extend towards one or more terminal ends of the channel to prevent cantilevering of the channel caused by a weight of the accessory.

The channel may be further reinforced by a gusset. The gusset may connect the channel to the mating portion. The gusset may be welded to the channel, the mating portion, or both. The gusset may further prevent distortion of the channel during installation, operation of the vehicle, or both. The gusset may prevent rotation of the channel. The gusset may prevent bending of one or more walls of the channel during installation of the accessory.

To further ensure stability of the channel, and thus the entire bracket, the mating portion may include a tab. The tab may function to prevent tilting, flexing, or other movement of the mating portion. The tab may prevent lateral movement, vertical movement, or both of the bracket. The tab may engage a portion of the cargo box. While the mating portion may abut one or more surfaces of the cargo box, the tab may further engage one or more additional surfaces. The tab may engage a lip of the cargo box. The lip may extend inwardly inside the cargo box or the lip may extend outwardly away from the cargo box. The lip may be positioned near a top edge of the cargo box.

The tab may project from a terminal edge of the mating portion. The tab may be formed along an interior portion of the mating portion, free from contact with a terminal edge. For example, the tab may be formed within the mating portion to engage the cargo box. The tab may extend around the top edge of the cargo box to contact the lip. The tab may further include a flange projecting one or more edges to further engage lip. The flange may project substantially orthogonal to a mating surface of the tab towards the lip. For example, the tab may abut the lip and the flange of the tab may extend into a groove of the lip. As such, the tab and flange may prevent unwanted movement of the bracket during operation of the vehicle, use of the bracket, or both.

The tab may be at least partially flexible to form a press-fit condition with the cargo box to retain the bracket. The tab may include one or more holes to receive a fastener. The fastener may extend through the tab and engage the lip of the cargo box. The fastener may be received by a receiving feature of the lip (e.g., a hole, nut, etc.) or may press again a surface of the lip. Thus, it is envisioned that tightening of the fastener against the surface of the lip may initiate a clamping force between the mating portion and the cargo box. Therefore, advantageously, the tab and fastener may secure the bracket in place free of additional holes or permanent distortions to the cargo box. It should also be noted that the tab may secure the bracket free of any fasteners.

Figure 1:
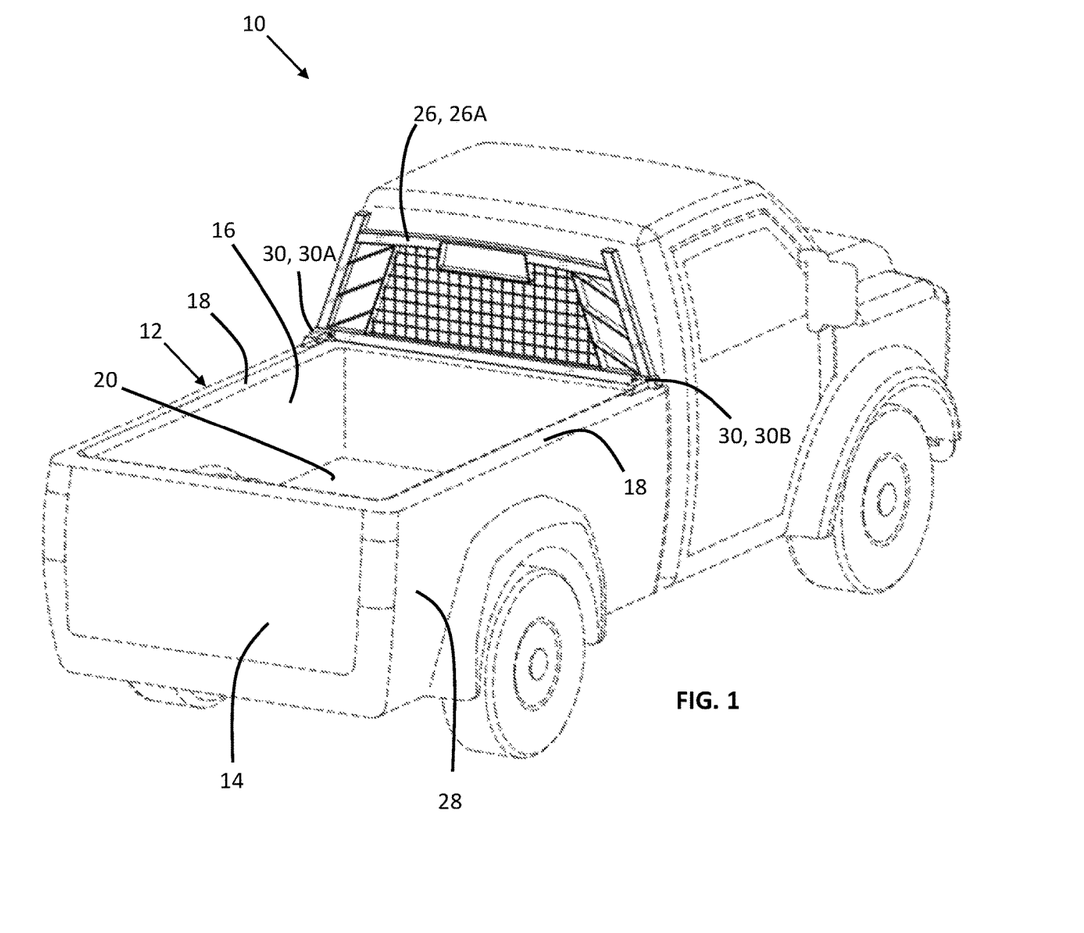
FIG. 1 illustrates a rear perspective view of a vehicle.

Turning now to the figures, FIG. 1 is a rear perspective view of a vehicle 10. The vehicle 10 includes a cargo box 12. An inside 20 of the cargo box may be enclosed by one or more inner panels 16 of the cargo box, a tailgate 14, or both. The inner panels 16, the tailgate 14, or both may form walls of the cargo box 12. The walls at least partially formed by the inner panels 16 may also include a top edge 18 extending at least partially around a perimeter of the cargo box 12. The top edge 18 may be defined by a thickness of the walls forming the cargo box 12, a thickness of the inner panels 16, or both. For example, the inner panels 16 may be secured or connected to an outer fender 28 of the cargo box 12. The top edge 18 may at least partially connect the inner panel 16 to the outer fender 28.

One or more brackets 30 may be secured along the cargo box 12 to secure an accessory 26 to the cargo box 12, a cab of the vehicle 10 adjacent to the cargo box 12, or both. For example, as illustrated, a headache rack 26A may span a width of the cargo box 12 and be secured to the cargo box 12 by a driver side bracket 30A and a passenger side bracket 30B. The brackets 30 may be secured along the top edge 18 of the cargo box 12 to position the headache rack 26A along a rear portion of the cab of the vehicle 10. The driver side bracket 30A and the passenger side bracket 30B may be the same, symmetrically opposite of each other, have different shapes relative to one another, or a combination thereof. It should be noted that while a headache rack 26A is shown, the brackets 30 may be configured to secure a variety of different accessories 26 other than a headache rack 26A. It is envisioned that the brackets 30 may be configured to secure one or more types of accessories along any portion of the cargo box 12. While a pair of brackets 30 is shown, any desired number of brackets may be used to secure the accessory 26.

Figure 2:
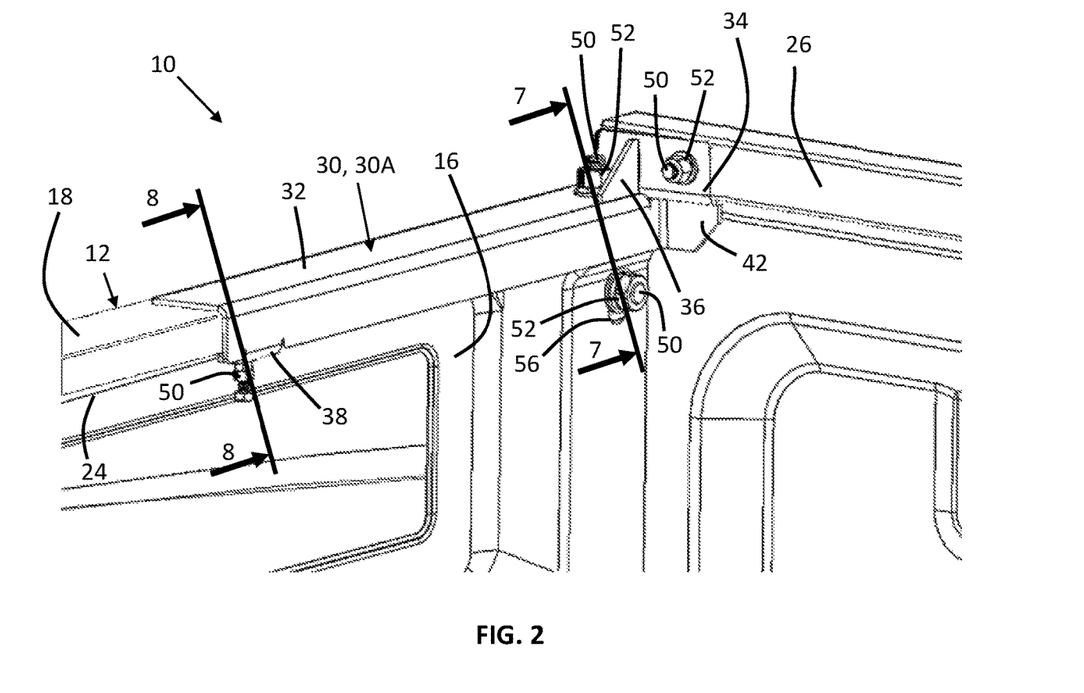
FIG. 2 illustrates a perspective view of a bracket secured to a cargo box of a vehicle.

FIG. 2 is a perspective view of a bracket 30 secured to a cargo box 12 of a vehicle 10 (see FIG. 1). The bracket 30 includes a mating portion 32 extending along a portion of the cargo box 12. As illustrated, the mating portion 32 may abut a top edge 18 of the cargo box 12. The top edge 18 may be at least partially formed by one or more inner panels 16 of the cargo box 12. The mating portion 32 may substantially follow a contour of the cargo box 12. As shown, the mating portion 32 may extend along the top edge 18 of the cargo box 12 so that the mating portion 32 may be substantially flush with the top edge 18.

Figure 7:
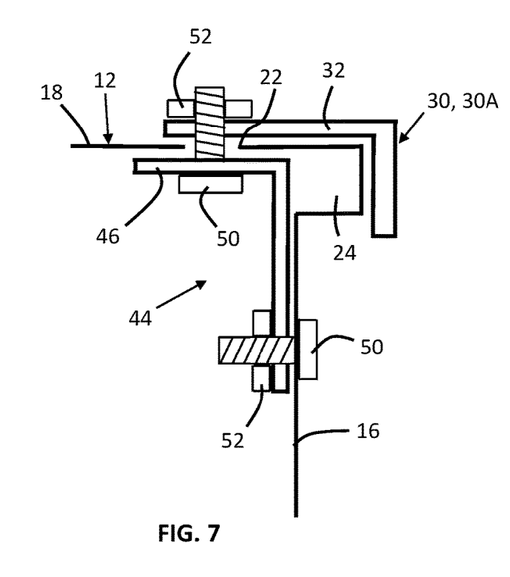
FIG. 7 is cross-section 7-7 of FIG. 2.
Figure 8:
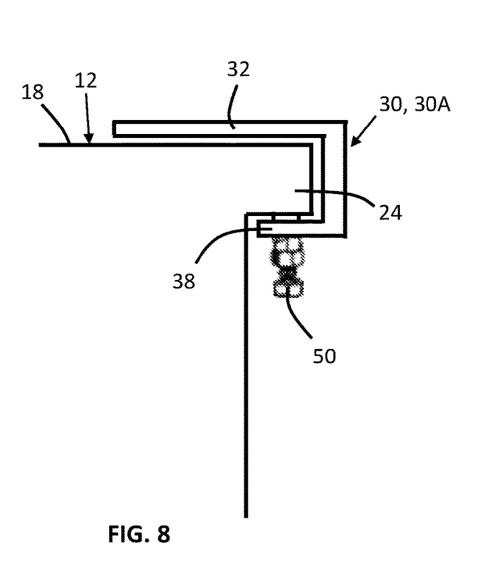
FIG. 8 is cross-section 8-8 of FIG. 2.

The mating portion 32 may also include a bend so that the mating portion 32 at least partially extends along, or is adjacent to, a lip 24 of the cargo box 12 (see FIGS. 7 and 8). A tab 38 may project from a terminal edge of the mating portion 32 to extend at least partially around the lip 24 of the cargo box 12. A fastener 50 may extend through the tab 38 to secure the mating portion 32 to the lip 24 and prevent unwanted movement of the bracket 30 relative to the cargo box 12.

A hole 40 may be positioned along the mating portion 40. While the hole 40 may be positioned anywhere along the mating portion 40, it is envisioned that the hole 40 may be at least partially aligned with a stake pocket along the top edge 18 of the cargo box 12 so that a fastener 50 may extend through the stake pocket to connect to a driver within the stake pocket (see FIG. 7). The driver may then be secured by an additional fastener 50 extending through a slot 56 in the inner panel 16 of the cargo box 12. While various configurations of fasteners 50 and drivers may be utilized, one or more of the fasteners 50 may be secured to the bracket 30, the inner panel 16, or both via a nut 52.

The bracket 30 may further include a channel 34 that receives at least a portion of an accessory 26 to mount the accessory 26 to the cargo box 12. The accessory 26 may be a headache rack, toolbox, tonneau cover, other accessory, or a combination thereof. It should be noted that one or a plurality of brackets 30 may be used to mount the accessory 30. As illustrated, the channel 34 may be secured to the mating portion 32 and further supported by an extension 42 of the bracket 30 projecting from the mating portion 32. The bracket may also include a gusset 36 connecting the channel 34 and the mating portion 32 to improve structural integrity of the bracket 30. The channel 34 may be configured to at least partially receive the accessory 26 so that a fastener 50 locked by a nut 52 may extend through the channel 34 and into the accessory 26.

Figure 3:
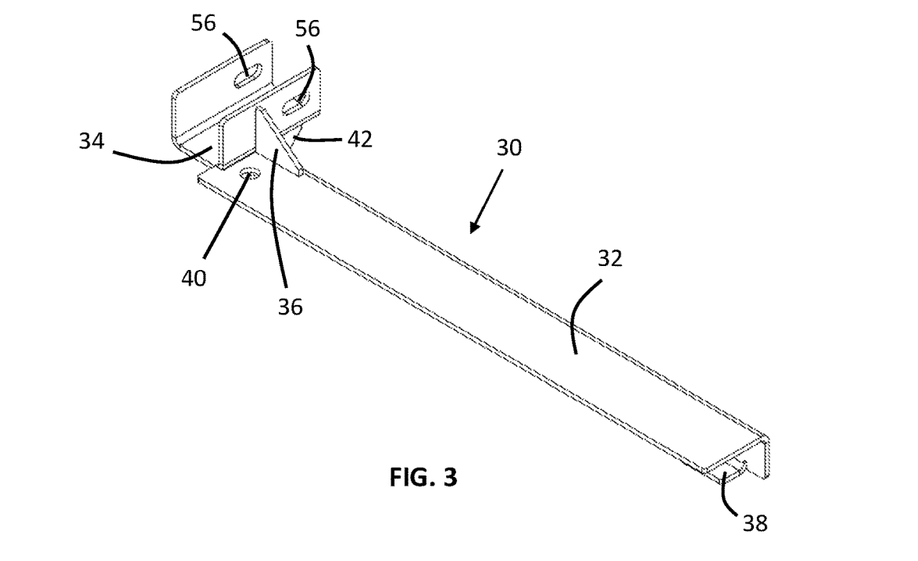
FIG. 3 illustrates a perspective view of a bracket in accordance with the present teachings.

FIG. 3 illustrates a perspective view of a bracket 30. The bracket 30 includes a mating portion 32 secured to a channel 34. The mating portion may at least partially extend along and mate with a portion of a cargo box of a vehicle. The mating portion 32 may be shaped to substantially follow a contour of the cargo box. Therefore, it is envisioned that the mating portion 32 may vary in dimensions and contour. The mating portion 32 may further include one or more tabs 38 projecting from one or more terminal edges. The one or more tabs 38 may secure the bracket to a portion of the cargo box, such as a lip (see FIGS. 2 and 8). Once secured, the tab 38 may prevent unwanted movement (e.g., rotation, flexing, bending, tilting, etc.) of the mating portion 32 relative to the cargo box. For example, the tab 38 may secure the mating portion 32 to the cargo box near an end of the mating portion 32 that opposing the channel 34. The channel 34 may receive at least a portion of an accessory to secure the accessory to the cargo box (see FIG. 2). Therefore, a significantly greater amount of weight may be supported by the channel 34 and a first end of the mating portion 32. The tab 38 may be positioned near an opposing second end of the mating portion 32 to prevent tilting and/or tipping of the bracket 34 caused by the weight near the first end of the mating portion 32. Thus, it is envisioned that the tab may facilitate positioning of the channel 34 off-centered along the mating portion 32 to allow for disproportionate weight distribution along the mating portion 32. Additionally, the channel 34 may be further supported by an extension 42 of the bracket 30 and secured to the mating portion 32 by a gusset 36.

The bracket 30 may be mounted to the cargo box using the tab 38 and one or more holes 40 along the mating portion 32. A fastener may extend through the holes 40 to fasten the bracket 30 to the cargo box. When the bracket 30 is secured to the cargo box, the accessory may be secured at least partially within the channel 34 with one or more additional fasteners extending through slots 56 along walls of the channel 34. As illustrated, the channel 34 may be substantially U-shaped and opposing walls of the channel 34 may include complimentary slots 56 to receive a fastener to secure the accessory.

Figure 4:
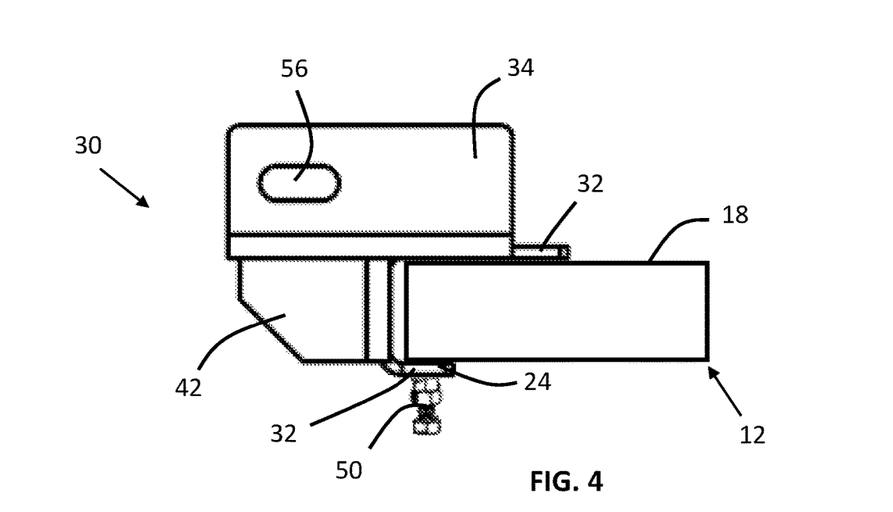
FIG. 4 illustrates a side view of a bracket secured a cargo box.

FIG. 4 illustrates a side view of a bracket 30 secured to a cargo box 12 of a vehicle. The bracket 30 includes a mating portion 32 disposed at least partially along a top edge 18 of the cargo box 12. The mating portion 32 may also follow a contour of the cargo box 12 so that a tab 24 of the mating portion 32 extends around a lip 24 of cargo box 12. A fastener 50 may be driven through the tab 32 and into the lip 24. The fastener 50 may thus at least partially secure the mating portion 32 to the cargo box 12. The bracket 30 may also further include a channel 34 that receives one or more accessories to mount the one or more accessories to the cargo box 12. The channel 34 may be supported by an extension 42 of the bracket 30 that extends away from the mating portion 32 along a bottom surface of the channel 34. Therefore, the extension 42 may support a weight of the one or more accessories when secured within the channel 34, thereby preventing distortion or damage to the channel 34, the bracket 30, or both. The one or more accessories may also be secured within the channel 34 via a fastener 56 extending through a slot 56 of the channel 34.

Figure 5:
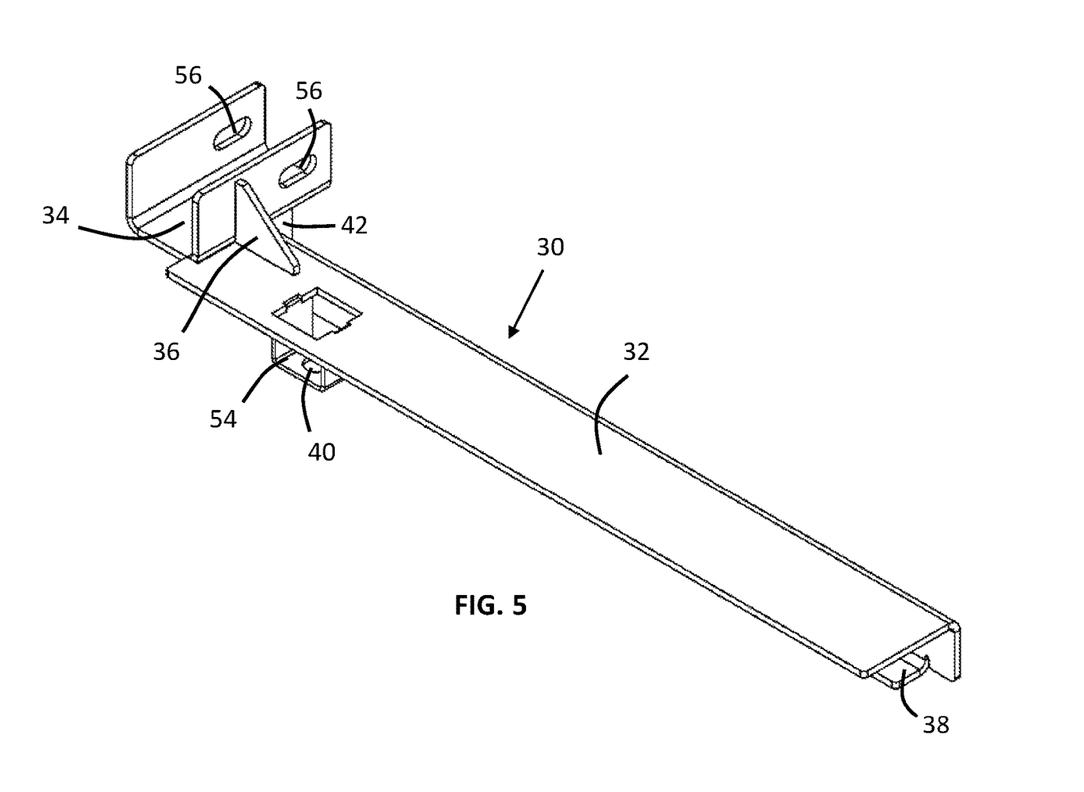
FIG. 5 illustrates a perspective view of a bracket in accordance with the present teachings.

FIG. 5 illustrates a perspective view of a bracket 30 similar to the bracket shown in FIG. 3. The bracket 30 includes a mating portion 32 secured to a channel 34. The mating portion may at least partially extend along and mate with a portion of a cargo box of a vehicle. The mating portion 32 may be shaped to substantially follow a contour of the cargo box. The mating portion 32 may further include one or more tabs 38 projecting from one or more terminal edges. The one or more tabs 38 may secure the bracket to a portion of the cargo box, such as a lip (see FIGS. 2 and 8). Once secured, the tab 38 may prevent unwanted movement (e.g., rotation, flexing, bending, tilting, etc.) of the mating portion 32 relative to the cargo box. For example, the tab 38 may be positioned near an opposing end of the mating portion 32 relative to the channel 34 to prevent tilting and/or tipping of the bracket 34 caused by additional weight near the channel 34. The channel 34 may receive at least a portion of an accessory to secure the accessory to the cargo box (see FIG. 2). Additionally, the channel 34 may be further supported by an extension 42 of the bracket 30 and secured to the mating portion 32 by a gusset 36.

The bracket 30 may be mounted to the cargo box using the tab 38 and one or more holes 40 along the mating portion 32. While the holes 40 may be located along an outer surface of the mating portion 32 as shown in FIG. 3, that holes may also be substantially recessed from the outer surface of the mating portion 32. As illustrated, the bracket 30 may include a pocket 54 recessed from the outer surface of the mating portion 32. The pocket 54 may be received by a stake pocket along a top edge of a cargo box (see FIG. 6). The pocket 54 may include the hole 40 so that a fastener may extend through the hole 40 to fasten the bracket 30 to the cargo box. Therefore, the fastener may be recessed from the outer surface of the mating portion 32, thereby at least partially preventing degradation to the fastener due to moisture, debris, or both. It should be noted that the pocket 54 of the bracket 30 may be recessed any desired depth based on the configuration of the stake pocket of the cargo box.

When the bracket 30 is secured to the cargo box, the accessory may be secured at least partially within the channel 34 with one or more additional fasteners extending through slots 56 along walls of the channel 34. As illustrated, the channel 34 may be substantially U-shaped and opposing walls of the channel 34 may include complimentary slots 56 to receive a fastener to secure the accessory.

Figure 6:
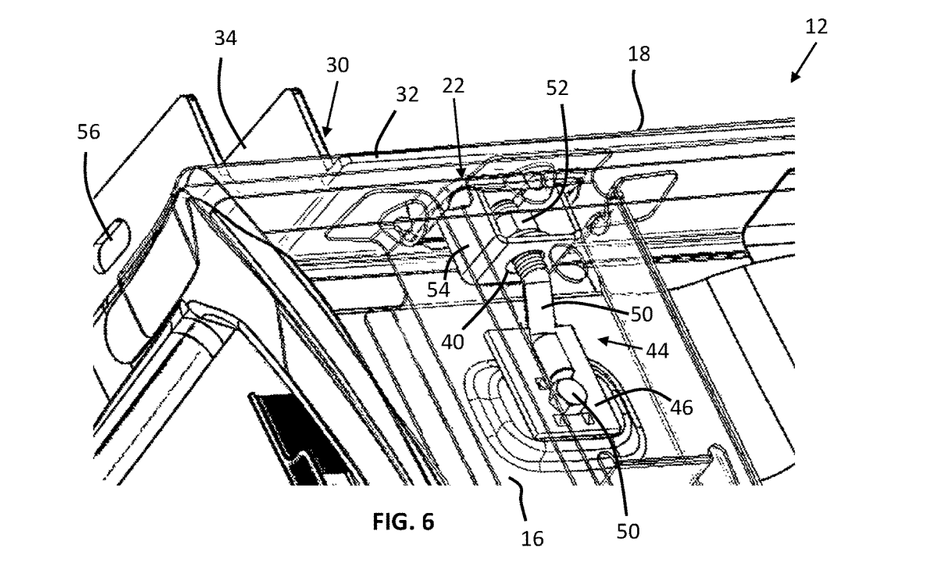
FIG. 6 is a perspective view of a bracket secured within a stake pocket of a cargo box.

FIG. 6 illustrates a perspective view of bracket 30 secured to a cargo box 12 or a vehicle. The bracket 30 includes a mating portion 32 positioned along a top edge 18 of the cargo box 12. A pocket 54 of the bracket 30 is recessed from an outer surface of the mating portion 32 and is positioned within a stake pocket 22 of the cargo box 12. The stake pocket 22 may include an opening along the top edge 18 of the cargo box 12 so that the pocket 54 of the bracket 30 may be positioned within the stake pocket 22 and the mating portion 32 of the bracket 30 rests along the top edge 18 of the cargo box 12.

The bracket 30 may be secured to the cargo box 12 via a driver 44 also positioned within the stake pocket 44. A fastener 50 may extend between a driver bracket 46 and the pocket 54 of the bracket 30 so that the bracket 30 is secured to the driver bracket 46. The fastener 50 may be threaded, welded, secured using other methods, or a combination thereof to the bracket 30, the driver bracket 46, or both. For example, as illustrated, the fastener 50 may be threaded on a first end to be received through a hole 40 of the pocket 40 and be secured to the bracket 30 using a nut 52. The fastener 50 may then be welded or crimped to the driver bracket 44 near an opposing second end of the fastener 50. The driver bracket 46 may then be secured to an inner panel 16 of the cargo box 14 using a second fastener 50, a second nut (not shown), or both (see FIG. 2). Therefore, the driver 44 may act as an intermediary between the cargo box 12 and the bracket 30 to secure the bracket 30 in a desired location. The driver 44 may secure the bracket 30 in conjunction with, or in lieu of, the tab shown in FIGS. 2 and 8.

The bracket 30 may further include a channel 34 positioned above the top edge 18 of the cargo box 12. The channel 34 may include one or more walls to at least partially receive an accessory being secured to the cargo box 12. As shown, the channel 34 may be substantially U-shaped and include one or more slots to secure the accessory within the channel 34 via a fastener. It should be noted that while a U-shaped channel 34 is illustrated, any desired channel shape and/or structure may be used based on the accessory being secured, a vehicle configuration, a shape of the cargo box 12, or a combination thereof.

FIG. 7 illustrates cross-section 7-7 of FIG. 2. As shown, the mating portion 32 of the driver side bracket 30, 3A rests along the top edge 18 of the cargo box 12. The mating portion 32 included a bend to form a substantially right-angled surface that abuts the top edge 18 of the cargo box 12 and also extends downwardly towards the lip 24. To secure the bracket 30 to the cargo box 12, a driver 44 is installed within a stake pocket 22 of the cargo box 12. The driver 44 includes a driver bracket 46 that may provide one or more connection points for the bracket 30. As illustrated, the bracket 30 may be secured to the driver bracket 46 through the stake pocket 22 using a fastener 50 extending through both the driver bracket 46 and the bracket 30. The fastener 50 may then be locked in place using a nut 52. The bracket 30 may also be secured to the cargo box 12 using a second fastener 50 extending through the inner panel 16 of the cargo box 12 and into a nut 52 positioned along the driver bracket 46. Therefore, it may be gleaned from the present teachings that the bracket 30 may be secured at a multitude of points to ensure the bracket 30 remains in a desired position during use (e.g., during movement of the vehicle, use of the accessory being secured to the bracket 30, or both).

FIG. 8 illustrates cross-section 8-8 of FIG. 2. As shown, the mating portion 32 of the driver side bracket 30, 3A rests along the top edge 18 of the cargo box 12. The mating portion 32 includes a bend to form a substantially right-angled surface that abuts the top edge 18 of the cargo box 12 and also extends downwardly towards the lip 24. The tab 38 of the bracket 30 extends around the lip 24 so that a fastener 50 may extend through the tab 38 and secure the bracket 30 to the cargo box 12. The fastener may extend into a hole of the lip 24 to secure the bracket 30. Alternatively, the fastener 50 may form compression fit by abutting a surface of the lip 24 and creating a clamping force on the bracket 30, thereby preventing unwanted movement of the bracket.

Figure 9A:
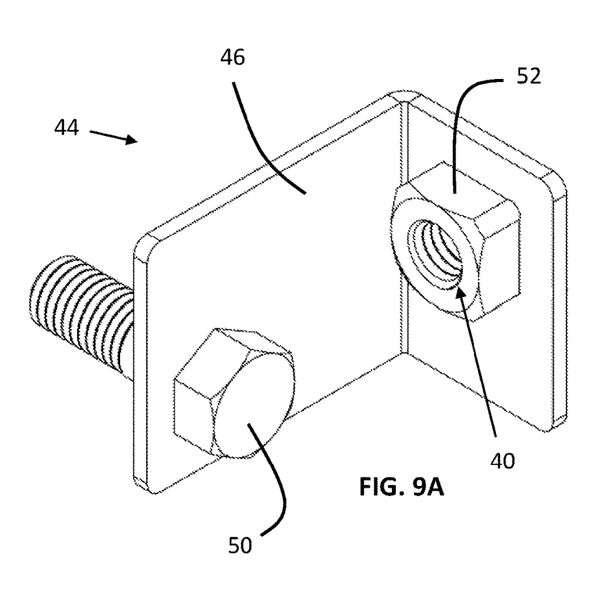
FIG. 9A is a perspective view of a driver.
Figure 9B:
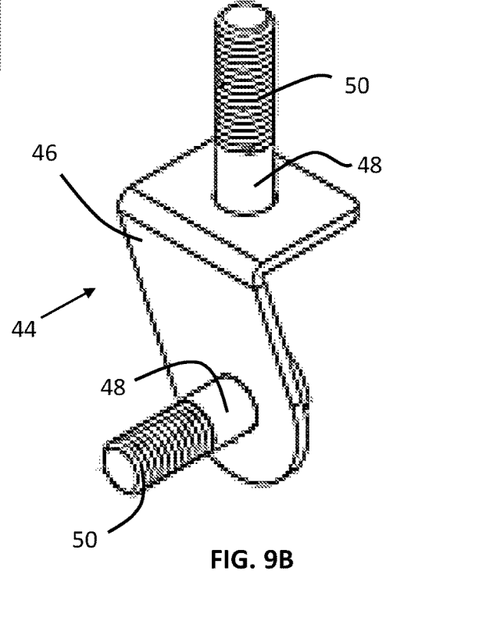
FIG. 9B is a perspective view of a driver.

FIGS. 9A and 9B illustrate perspective views of exemplary drivers 44. The drivers 44 may include a driver bracket 46 configured to be positioned within an interior portion of one or more walls of a cargo box (see FIG. 6). The drivers 44 may also include one or more fasteners 50, nuts 52, or both to secure the bracket to the cargo box.

As shown in FIG. 9A, the driver 44 may include a fastener 50 extending outwardly to engage a hole of the bracket. The driver 44 may also include a nut 52 to receive a fastener extending through and/or from the bracket into a hole 40 of the driver bracket 46, and thus into the nut 40. The fastener 50, the nut 52, or both may be welded and/or adhered to the driver bracket 46 to ensure the fastener 50, the nut 52, or both are secured during installation.

Similarly, as shown in FIG. 9B, the driver 44 may include a pair of fasteners 50 extending from the driver bracket 46 to engage a portion of the bracket being secured to the cargo box. The fasteners 50 may extend through one or more panels of the cargo box, through a stake pocket of the cargo box, or both. The fasteners 50 may also extend through tubing of the driver 50. Therefore, a threading of the fasteners 50 may only be exposed in areas where the fasteners 50 are not within the tubing 48. It should also be noted based on the driver brackets 46 shown in FIGS. 9A and 9B that any desired shape may be used to meet demands of a given vehicle application.

Figure 10:
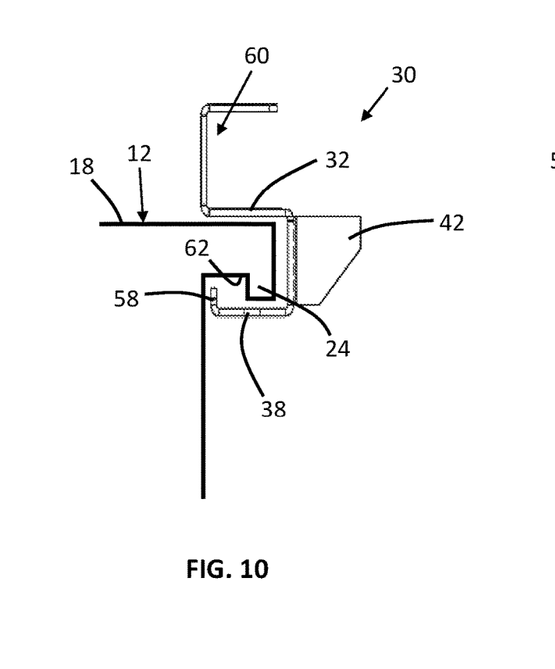
FIG. 10 is a cross-sectional view of a bracket secured to a cargo box.

FIG. 10 illustrates a cross-sectional view of a bracket 30 secured to a cargo box 12. The bracket 30 includes a mating portion 32 that abuts a top edge 18 of the cargo box 12. Similar to the bracket 30 shown in FIG. 8, the mating portion 32 includes a bend to form a substantially right-angled surface that abuts the top edge 18 of the cargo box 12 and also extends downwardly towards a lip 24. A tab 38 of the bracket 30 extends around the lip 28. The tab 38 may further include a flange 58 projecting from the tab 38 in a substantially perpendicular direction. The flange 58 may further engage the lip 28 of the cargo box 12 to prevent unwanted movement of the bracket 30. As illustrated, the flange 58 may be at least partially received by a groove 62 of the lip 28. The interaction of the flange 58 and the groove 62 may prevent rotation, lateral movement, horizontal movement, or a combination thereof of the bracket 30 relative to the cargo box 12. It is envisioned that the flange 58 may prevent unwanted detachment of the bracket 30 from the cargo box 12 during operation or use. It should be noted that the groove 62 may be used in lieu of, or in conjunction with, one or more fasteners to secure the bracket 30 to the lip 24 (see FIG. 8).

As shown, the bracket 30 may further include a duct 60 positioned along the top edge 18 of the cargo box 12. The duct 60 may be at least partially enclosed by one or more walls to receive a portion of an accessory, additional components of the bracket 30, a portion of the cargo box, or a combination thereof. For example, the duct 60 may receive a portion of a tonneau cover to secure the tonneau cover to the cargo box 12. The bracket 30 may further include an extension 42 projecting from the mating portion 32 to provide additional structural integrity.

ELEMENT LIST

10 Vehicle
12 Cargo Box
14 Tailgate
16 Inner Panel of the Cargo Box
18 Top Edge of the Cargo Box
20 Inside of the Cargo Box
22 Stake Pocket of the Cargo Box
24 Lip of the Cargo Box
26 Accessory
28 Fender
30 Bracket
30A Driver Side Bracket
30B Passenger Side Bracket
32 Mating Portion
34 Channel
36 Gusset
38 Tab
40 Hole
42 Extension
44 Driver
46 Driver Bracket
48 Tubing
50 Fastener 52 Nut
54 Pocket of the Bracket
56 Slot
58 Flange
60 Duct
62 Groove The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A bracket comprising:
   (a) a mating portion;
   (b) a channel secured to the mating portion; and
   (c) a tab extending from a terminal edge of the mating portion;
   wherein the mating portion is configured to abut a top edge of a cargo box of a vehicle and the tab is configured to at least partially extends around a lip of the cargo box to secure the bracket to the top edge of the cargo box; wherein the mating portion includes a hole configured to at least partially align with a stake pocket along the top edge of the cargo box, and a fastener is configured to extend through the hold and into the stake pocket to secure the bracket.

2. The bracket of claim 1, wherein the channel is at least partially supported by the mating portion and is connected to the mating portion by a gusset.

3. The bracket of claim 2, wherein the channel is supported by an extension of the mating portion extending toward an inside of the cargo box.

4. The bracket of claim 1, wherein the tab includes a flange that is configured to be at least partially received by a groove of the lip.

5. The bracket of claim 1, wherein the fastener is configured to extend into the stake pocket and to be secured to a driver positioned within the stake pocket.

6. The bracket of claim 5, wherein the bracket is configured to be further mounted to the driver via a fastener extending through the bracket and an inner panel of the cargo box.

7. The bracket of claim 1, wherein the channel is secured to the mating portion near a first end and the tab is positioned near an opposing second end of the mating portion.

8. The bracket of claim 1, wherein the mating portion includes a pocket recessed from an external surface of the mating portion, and the mating portion is configured to be at least partially received by a stake pocket along the top edge of the cargo box.

9. The bracket of claim 1, wherein the bracket is configured to secure an accessory to the cargo box.

10. The bracket of claim 9, wherein the accessory is a headache rack disposed across opposing sides of the cargo box and positioned adjacent to a cab of the vehicle.

11. A bracket assembly comprising the bracket of claim 1, the bracket assembly further comprising a driver having a driver bracket; wherein the driver bracket is configured to be positioned within a cavity of a wall defining a portion of the cargo box, and the bracket is secured to the driver bracket via a fastener, a nut, or both.

12. The bracket assembly of claim 11, wherein the driver includes a fixed nut secured to the driver bracket and a fastener extending through the bracket is received by the fixed nut to secure the bracket to the driver bracket.

13. The bracket assembly of claim 11, wherein the driver includes a fixed fastener secured to the driver bracket and the fixed fastener extends through a hole of the bracket to secure the bracket to the drive bracket.

14. The bracket of claim 1, wherein the channel is a U-shaped channel having an open end to receive an accessory.

15. The bracket of claim 1, wherein the mating portion is configured to be secured to the cargo box at both a first end and an opposing second end by a fastener.

16. A bracket comprising:
(a) a mating portion having a tab extending from a terminal edge, wherein the tab includes a hole to receive a fastener to secure the mating portion to a top edge of a cargo box of a vehicle; and
(b) a channel positioned near an opposing terminal edge of the mating portion and secured to an outer surface of the mating portion, wherein the channel is further secured to the mating portion by a gusset;
wherein the fastener extends through the tab and is configured to engage a lip of the cargo box, and the engagement results in a clamping force between an inner surface of the mating portion and the top edge of the cargo box.

17. The bracket of claim 16, wherein the channel is supported by an extension projection from the outer surface of the mating portion.

18. The bracket of claim 16, wherein the mating portion includes a hole configured to at least partially aligns with a stake pocket along the top edge of the cargo box, and a fastener is configured to extend through the hole and into the stake pocket to secure the bracket to a driver positioned within the stake pocket.

19. The bracket of claim 18, wherein the bracket is further adapted to be mounted to the driver by a second fastener extending through the bracket and an inner panel of the cargo box.

\* \* \* \* \*